United States Patent
Fisher, Jr.

(10) Patent No.: US 6,194,793 B1
(45) Date of Patent: Feb. 27, 2001

(54) APPARATUS AND METHOD FOR CHARGING AN ENERGY STORAGE SOURCE

(75) Inventor: Carl Fisher, Jr., Longmont, CO (US)

(73) Assignee: OKC Products, Inc., Longmont, CO (US)

( * ) Notice: Subject to any disclaimer, the term of this patent is extended or adjusted under 35 U.S.C. 154(b) by 0 days.

(21) Appl. No.: 09/131,254

(22) Filed: Aug. 7, 1998

(51) Int. Cl.[7] .................................................. H02J 7/02
(52) U.S. Cl. ................................................................ 307/66
(58) Field of Search ................................. 307/43, 46, 66

(56) References Cited

U.S. PATENT DOCUMENTS

| | | | |
|---|---|---|---|
| 4,775,800 | 10/1988 | Wood | 307/46 |
| 5,610,450 | 3/1997 | Saeki | 307/46 |
| 5,712,795 | 1/1998 | Layman | 364/472 |
| 5,834,857 | 11/1998 | Abe | 307/66 |

OTHER PUBLICATIONS

"Single–Cell Solar 5–V Supply," *Electronic Design*, p. 90 and p. 92 (Apr. 15, 1996).

Component Catalog: "TPS2014, TPS2015 Power Distribution Switches," *Texas Instruments*, pp. 1–24 (Dec. 1996).

Component Catalog: "TPS7101Q, TPS7133Q, PTS7148Q, TPS7150Q Low–Dropout Voltage Regulators," *Texas Instruments*, pp. 1–32 (Nov. 1994).

Component Catalog: "5V/3.3V/3V/Adjustable–Output, Step–Up/Step–Down DC–DC Converters," *MAXIM Integrated Products*, pp. 1–12, with "MAX877 Evaluation Kit," pp. 1–4 attached (May 1994).

Component Catalog: "LP2950/LP2950AC/LP2950C 5V and LP2951/LP2951AC/LP2951C Adjustable Micropower Voltage Regulators," *National Semiconductor Corporation*, pp. 1–16 (May 1989).

*Primary Examiner*—Josie Ballato
*Assistant Examiner*—Robert L. DeBeradinis
(74) *Attorney, Agent, or Firm*—James R. Young; Chrisman Bynum & Johnson

(57) ABSTRACT

A power supply for supplying energy to a load includes an energy supply source for generating energy, an energy storage device that is charged from the energy generated by the energy supply source, an optional regulator for improving the energy matching of the energy supply source and the energy storage device, an energy converter for delivering energy from the energy storage device and/or the energy supply source to a load, a detector for monitoring the energy level of the energy storage device and for determining when to activate the energy converter to allow energy delivery to the load from the energy storage device and/or the energy supply source, an optional energy discharge controller that allows the energy storage device to discharge over time, and an optional switch controller for controlling a switch, valve, relay, etc.

42 Claims, 3 Drawing Sheets

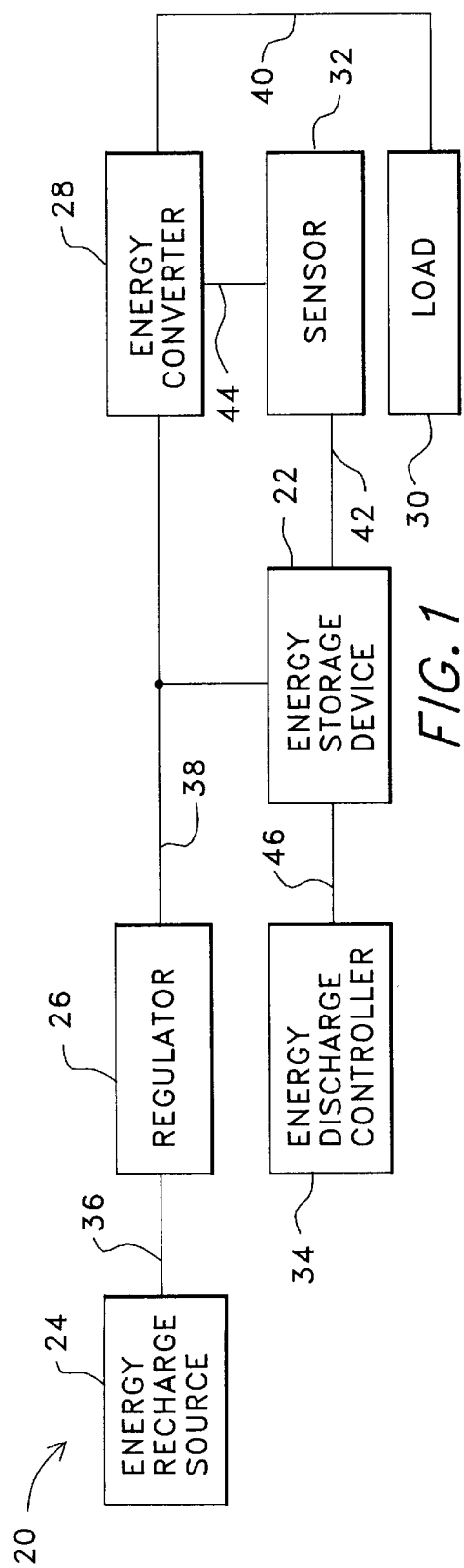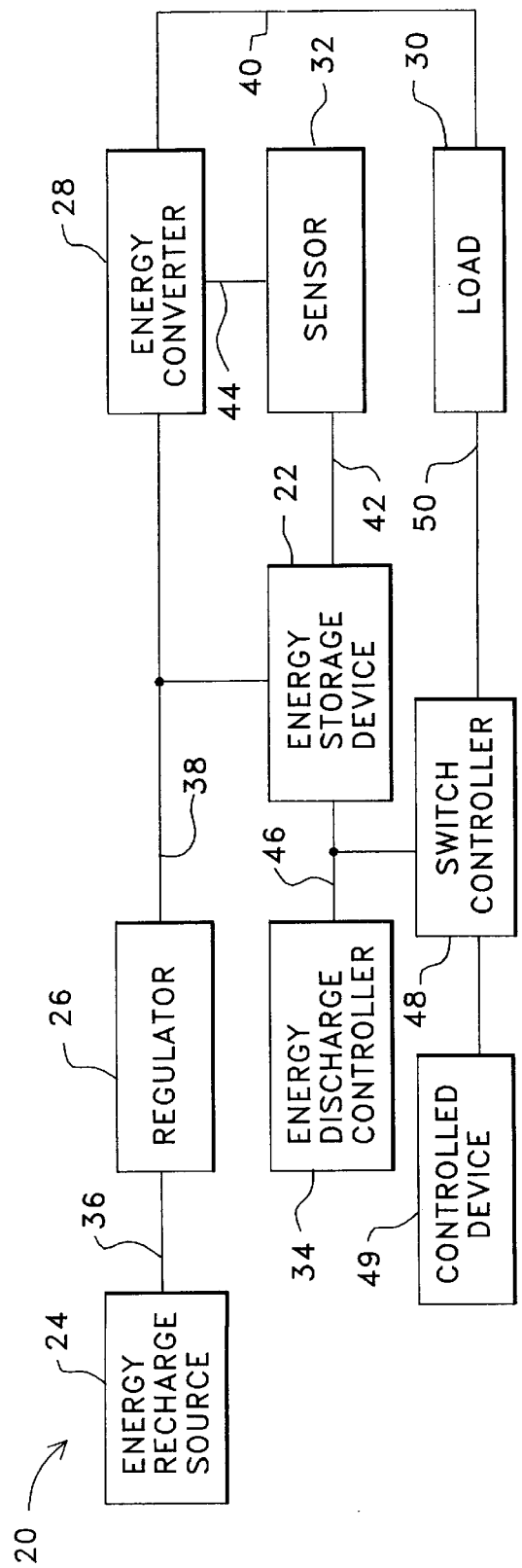

APPARATUS AND METHOD FOR CHARGING AN ENERGY STORAGE SOURCE

BACKGROUND OF THE INVENTION

1. Field Invention

The present invention relates generally to a method and apparatus for charging an energy storage device, such as a battery, in a power supply and, more specifically, to a method and apparatus for simultaneously or sequentially charging an energy storage device and providing electric power to a load with an intermittent and/or variable energy source.

2. Description of the Prior Art

In recent years, the use of alternative energy or power sources such as, for example, solar energy, wind energy, and geothermal energy, has become increasingly important. In addition, the desire to place such alternative energy or power sources in remote locations unreachable by conventional electric power or utility grids has steadily increased. For example, a telephone, radio, oven or other device may be located far from traditional electric power grids or utilities and powered by solar or wind energy.

In a typical configuration of a remotely located device requiring electric power for operation, a power source may be used to charge and/or recharge a battery, capacitor, or other energy storage source. The power source and the battery may be used to supply electric energy to the device either sequentially or simultaneously. For example, a remotely located emergency radio may be connected to a battery to provide power to the radio. A solar panel or other energy source can be connected to the battery to maintain a charge in the battery. Additionally, the solar panel may directly provide power to the radio. The solar panel may be used to provide electric power to the radio during the day as well as charging the battery. During the evening or when the sky is overcast or cloudy such that the solar panel cannot generate enough electric power for the radio, the battery may be used to provide electric power to the radio.

Unfortunately, in many configurations wherein a recharging power source, such as a solar panel or solar array, is used to charge a battery, battery pack, or other rechargeable power source that is, in turn, used to provide power to a device, such as a remotely located radio or telephone, the recharging power or energy source is oversized in order to maintain the battery at or above its rated nominal voltage or energy storage capacity. In addition, the battery is often oversized itself to insure that the battery does not discharge below the minimum required voltage needed to operate the device during, for example, periods of cloudy weather or nighttime operation. As a result, the battery is maintained in a fully charged or overcharged state which reduces the battery's capacity and ability to maintain a charge and leads to a premature failure of the battery. Furthermore, efficiency of power delivery to a load from either the recharging power source or the rechargeable power source is often significantly reduced, thereby wasting power.

Therefore, in spite of the developments in the art in battery charging technology, there remains a need for a charger or charging system for a battery or other power source that is simple to construct, allows for the charging of a battery or other power source simultaneously or concurrently with delivery of electric power to a load, improves battery charging efficiency, improves efficiency of electric power delivery to a load, and does not cause the battery to fail prematurely.

SUMMARY OF THE INVENTION

Accordingly, it is a general object of the present invention to provide an apparatus and method for initially charging, self-starting, and operating a power supply with an intermittent and/or variable power source, and a rechargeable energy storage device.

A more specific object of this invention is to improve performance and dependability of a power supply, including initial energization, especially for a power supply which has an electric energy producing source that produces electric energy intermittently and/or at varying performance levels, a rechargeable electric energy storage device that stores and outputs electric energy at varying voltages and that may have very low or virtually no energy or voltage at start-up or at other times, and an energy converter that converts input electric energy of varying voltages to output electric energy of a constant voltage output to power a load.

Still another object of the present invention is to provide an apparatus and method for reducing overcharging of a chargeable energy storage device.

It is another object of the present invention is to provide an apparatus and method for providing electric power or energy to a load while simultaneously or concurrently charging a chargeable energy storage device.

A further object of the present invention is to provide an apparatus and method for improving the efficiency of energy delivery to a load.

It is yet another object of the present invention to provide an apparatus and method for matching the electric power output of a recharging power source to the energy storage capacity of a chargeable energy storage device.

An additional object of the present invention is to provide an apparatus and method for improving charging efficiency during charging of a chargeable energy storage device.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a first embodiment of a power supply in accordance with the present invention includes an energy storage device that is charged from power or energy generated by an energy recharge or supply source, an optional regulator for improved matching the output of the energy recharge source to the input of the energy storage device, an energy converter for delivering power from the energy storage device or the energy recharge source to a load, a sensor for determining when to activate the energy converter to allow power delivery to the load from the energy storage device or the energy recharge source, and an optional energy discharge controller that allows the energy storage device to discharge over time. A second embodiment of the power supply of the present invention includes a switch converter powered by the energy storage device and activated by the load.

To further achieve the foregoing and other objects, the present invention further comprises a method of supplying energy to a chargeable energy storage device, monitoring the energy or charge buildup in the chargeable energy storage device, and supplying energy to a load when said energy buildup or charge in the chargeable energy storage device, exceeds a threshold level.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 1 is a functional block diagram of the power supply of the present invention;

FIG. 2 is a functional block diagram of a second embodiment of the power supply of the present invention and illustrates the addition of a switch controller to the power supply of FIG. 1;

DETAILED DESCRIPTION OF THE PREFERRED EMBODIMENTS

Figure 3:
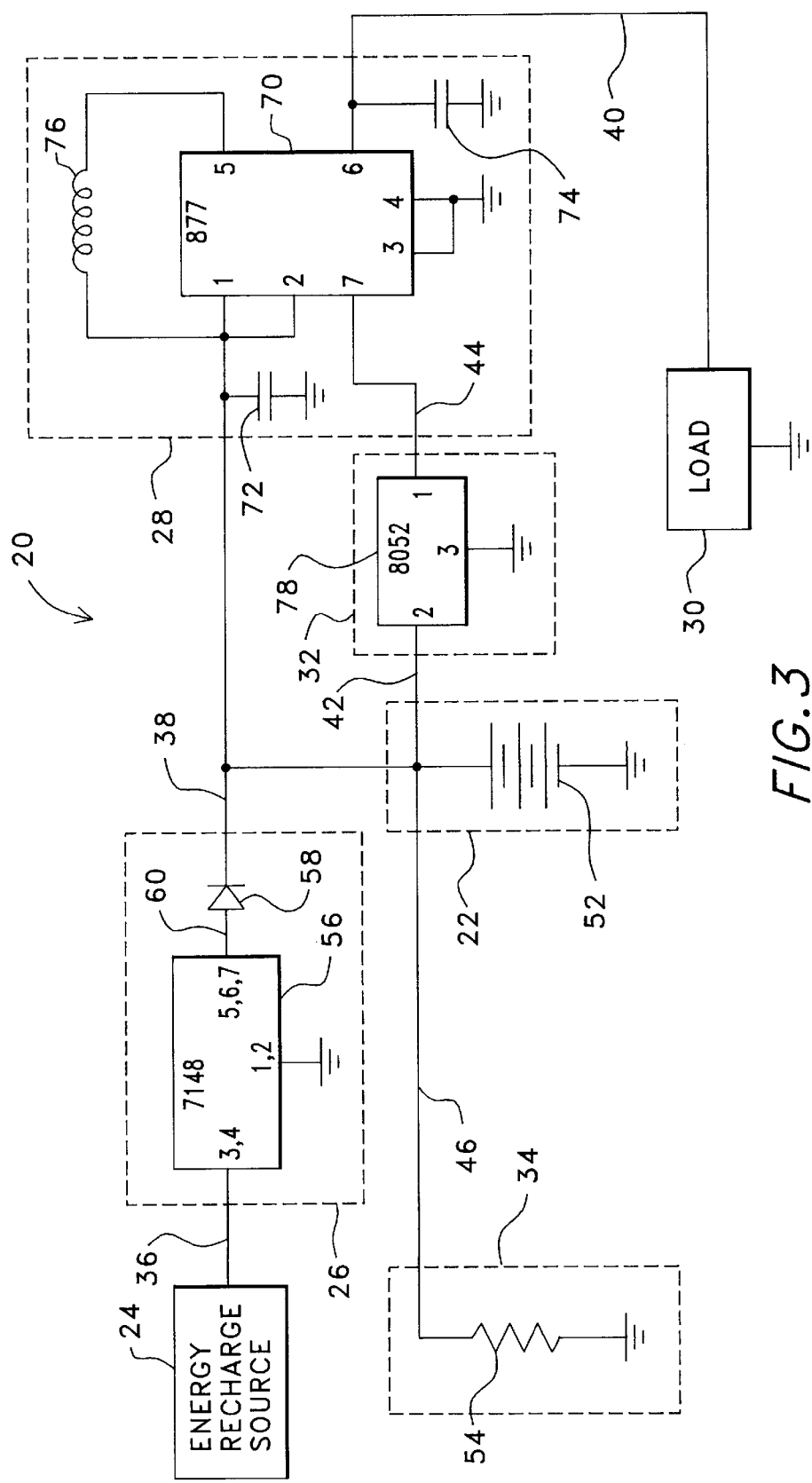
FIG. 3 is an exemplary schematic diagram of the power supply of FIG. 1.

A first embodiment of a power supply 20 in accordance with the present invention is illustrated in FIG. 1 and includes an energy storage device 22 that is charged from power or energy generated by an energy recharge or supply source 24, an optional regulator 26 for improving the matching of the energy recharge source 24 to the energy storage device 22 and for reducing overcharging of the energy storage device 22, an energy converter 28 for delivering power or energy from the energy storage device 22 or the energy recharge source 24 to a load 30, a sensor or detector 32 for monitoring the amount of energy stored in the energy storage device 22 and for determining when to activate the energy converter 28 to allow power or energy delivery to the load 30 from the energy storage device 22 or the energy recharge source 24, and an optional energy discharge controller 34 that allows the energy storage device 22 to discharge or drain its stored energy over time. Each of these components of the power supply 20 will be discussed in more detail below.

A significant advantage of the power supply 20 of the present invention is that it allows energy to be delivered to the load 30 from the energy storage device 22 or the energy recharge source 24 while also allowing the energy recharge source 24 to provide energy to the energy storage device 22 so as to build up and increase the amount of energy stored in the energy storage device 22. Another significant advantage of the power supply 20 of the present invention is that it improves the efficiency of energy delivery to the load 30 while reducing the likelihood or propensity for premature failure of the energy storage device 22. Still another significant advantage of the power supply 20 of this invention is that it prevents energy delivery to the load 30 when the energy storage device 22 is in a discharged or low condition so that all of the energy generated by the energy recharge source 24 is supplied or made available to the energy storage device 22 until the voltage of the energy storage device 22 builds up to a minimum voltage threshold level at which the energy converter 28 will operate at a minimum desired energy conversion efficiency level. This feature allows the energy recharge source 24 to build up the amount of energy in the energy storage device 22 first and then to deliver and maintain delivery of energy to the load 30 as well as to continue building up and maintaining energy in the storage energy device 22 during periods when the energy recharge source 24 is producing enough energy to do so. All of these and other advantages will also be discussed in more detail below.

The energy storage device 22 may be any kind of power or energy storage device such as, for example, a battery, a battery pack, a capacitor, a capacitor bank, power cell, etc. For purposes of the present invention, the energy storage device 22 is preferably rechargeable such that the power or energy expended or supplied by the energy storage device 22 can be replenished.

The energy supply or recharge source 24 may be any kind of power or energy producing device or system such as, for example, a solar cell, solar panel, solar array, wind turbine, hydroelectric generator, transformer, power or electric grid, magnetic generator, thermal electric generator, etc. The load 30 can be any kind of electrical load requiring electric power or energy. For example, the load 30 may be a switch, telephone, radio, relay, valve, controller, oven, pump, etc. The power supply 20 is particularly well suited for remote applications when the load 30 requires a continuous or constant power source, such as, for example, in remote gas or oil well operations wherein only periodic or sporadic human intervention at the gas or oil well site is desired or possible to monitor the operations of the oil or gas well, or in situations where electrical power or energy cannot easily or economically be supplied to the load 30 from an electric power grid.

The energy recharge source 24 is connected to the optional regulator 26 via the node 36 such that energy or power generated or otherwise produced by the energy recharge source 24 is delivered to or flows to the regulator 26. The optional regulator 26 is connected to the energy storage device 22 and the energy converter 28 via the node 38. The regulator 26 couples the energy recharge source 24 to the energy storage device 22 and the energy converter 28 and preferably improves the matching of the power or energy output of the energy recharge source 24 to the power storage capacity of the energy storage device 22. For example, if the energy storage capacity of the energy storage device 22 is five volts, the regulator 26 preferably limits the voltage produced on the node 38 to no more than five volts to reduce and even prevent overcharging of the energy storage device 22 which might cause or lead to premature failure of the energy storage device 22. Depending on the operating conditions and capabilities of the energy storage device 22 and the energy recharge source 24, a close enough match may exist between the energy recharge source 24 and the energy storage device 22 such that the regulator 26 is not needed and the energy recharge source 24 can be connected directly to the node 38. If desired, an on/off switch may be placed between the energy recharge source 24 and the optional regulator 26 to allow isolation of the energy recharge source 24 from the remainder of the power supply 20. Alternatively, or in addition, if desired, an on/off switch may also be placed between the energy storage device 22 and the node 38 to allow decoupling or disconnection of the energy storage device 22 from the energy recharge source 24.

Power and energy supplied by the energy recharge source 24 is delivered to the energy storage device 22 via the node 38 to charge the energy storage device 22 and to replenish and build up the energy stored in the energy storage device 22, thereby increasing the charge of the energy storage device 22. In addition, power and energy supplied by the energy recharge source 24 and/or by the energy storage device 22 is delivered to the energy converter 28 via the node 38 which may, in turn, be supplied to the load 30 via the node 40. Thus, the energy converter 28 couples the load 30 to the node 38 and the energy supplied by the energy recharge source 24 and/or by the energy storage device 22 and acts as an energy converter between the nodes 38 and 40. Preferably, the energy converter 28 is capable of creating or delivering a consistent or approximately constant output energy level on the node 40 regardless of the input energy level to the energy converter 28 on the node 38. For example, even if the input voltage to the energy converter 28 on the node 38 varies between one and six volts, the output voltage of the energy converter 28 on the node 40 which is supplied to the load 30 preferably remains approximately constant at five volts. A varying output energy level supplied by the energy converter 28 on the node 40 might damage the load 30 or cause inconsistent or incorrect operation of the load 30. The energy converter 28 also preferably transfers energy on the node 38 to the node 40 at a high enough energy conversion efficiency level such that wasted energy is reduced.

As previously discussed above, two important features of the power supply 20 of the present invention are that the energy recharge source 24 is enabled to supply power and energy to both the energy storage device 22 and to the load 30, sequentially or concurrently, depending on voltage level, and that both the energy storage device 22 and the energy recharge source 24 can efficiently supply power and energy to the load 30. For example, the energy recharge source 24 may be used to provide power to charge the energy storage device 22, thereby increasing the amount of energy stored in the energy storage device 22, and to operate the load 30 during the day. During the evening, cloudy weather, or other times when the energy recharge source 24 cannot generate sufficient power or energy to operate the load 30, the power and energy stored in the energy storage device 22 can be supplied to the load 30 to operate the load 30. This situation may occur when the energy storage device 22 is a rechargeable battery and the energy recharge source 24 is a solar cell, panel, or array that can only generate power when sufficient sun light is incident on the solar cell, panel, or array 24. As a result, the solar cell, panel, or array 24 can provide electric power or energy to operate the load 30 and recharge the battery 22 during the day, and the battery 22 can provide electric power or energy to operate the load 30 during the evening or other periods of insufficient sunlight.

The energy converter 28 couples the load 30 to energy sources, thereby allowing energy from the energy storage device 22 and/or the energy recharge source 24 to flow to the load 30. The energy converter 28 is activated or controlled by the sensor 32, which is connected to the energy storage device 22 via the node 42 and to the energy converter 28 via the node 44. The sensor 32 monitors energy buildup in the energy storage device 22 and detects when the amount of energy or charge stored in the energy storage device 22 reaches or exceeds a minimum threshold level. More specifically, while the sensor 32 may allow energy generated by the energy recharge source 24 to be delivered to the load 30 via the energy converter 28 regardless of the amount of power or energy stored in the energy storage device 22, the sensor 32 will preferably prevent any energy generated by the energy recharge source 24 from being delivered to the load 30 via the energy converter 28 until such time as the energy storage device 22 has reached a minimum threshold of energy storage or a minimum charge level. For example, if the energy storage device 22 is an uncharged or low charged battery and the energy recharge source 24 is a solar panel capable of generating electric energy, the sensor 32 may prevent the energy converter 28 from allowing electric energy or power generated by the solar panel from flowing or being delivered by the energy converter 28 to the load 30 on the node 40 such that all of the electric power or energy supplied by energy recharge source 24 flows and is delivered to the battery (i.e., the energy storage device 22), thereby charging the battery. When the battery 22 obtains a threshold charge level such as, for example, two volts, the sensor 32 may activate the energy converter 28 so as to allow electric power and energy generated by the solar array, (i.e., the energy recharge source 24) to be delivered to both the load 30 via the energy converter 28 and to the battery 22, thereby allowing the battery 22 to continue charging or energizing while providing sufficient energy on the node 40 to operate the load 30.

The minimum threshold energy or charge level of the energy storage device 22 that is chosen to be sufficient for the sensor 32 to activate or turn on the energy converter 28, thereby coupling the load 30 to the node 38 so as to allow energy generated by the energy recharge source 24 and/or accumulated in the energy storage device 22 to be supplied by the energy converter 28 to the load 30 via the node 40, may vary depending on the type of application. For example, the minimum energy or charge level threshold for the energy storage device 22 needed by the sensor 32 may be determined by the power or energy requirements of the load 30 as a way of insuring that enough stored energy exists in the energy storage device 22 to operate the load 30 if the energy recharge source 24 cannot supply sufficient energy to operate the load 30. Alternatively, the minimum energy or charge level threshold for the energy storage device 22 needed by the sensor 32 may be determined by the capacity of the energy storage device 22, such that the sensor 32 activates the energy converter 28 when the energy storage device 22 has reached a certain percentage of its energy storage capacity. As a further alternative, the sensor 32 may be configured such that the energy converter 28 is activated only when the energy converter 28 is operating at a minimum desired efficiency level, that is, when the energy converter 28 converts its input energy on the node 38 to output energy on the node 40 at or above a minimum efficiency level, thereby reducing wasted energy. Since the amount of energy stored in the energy storage device 22 may largely determine the operating efficiency of the energy converter 28, the efficiency level of the energy converter 28 may be heavily influenced by the energy storage capacity of the energy storage device 22, as will described in more detail below. Preferably, the sensor 32 activates the energy converter 28 when the energy converter 28 will convert its input energy on the node 38 to output energy on the node 40 at an efficiency greater than or equal to fifty percent (50%) and optimally when such conversion efficiency or the energy converter 28 is greater than or equal to seventy percent (70%).

If desired, the sensor or energy level monitor 32 may deactivate or turn off the energy converter 28 when the amount of power or energy stored in the energy storage device 22 falls below a minimum threshold level, which may be the same as or different from the minimum energy storage level in the energy storage device 22 that is required by the sensor 32 to activate the energy converter 28, in order to prevent the energy storage device 22 from completely discharging or to allow time for the energy storage device 22 to be recharged by energy supplied by the energy recharge source 24.

The energy storage device 22 is connected or coupled to the optional energy discharge controller 34 via the node 46.

As previously discussed above, the optional energy discharge controller 34 allows energy or charge stored in the energy storage device 22 to be discharged. The energy discharge controller 34 preferably does not discharge the energy storage device 22 at a rate faster than the rate at which the energy storage device 22 is charged by power and energy supplied by the energy recharge source 24. However, when the energy recharge source 24 is not providing sufficient energy to the energy storage device 22 or if the load 30 is disconnected or decoupled from the remainder of the power supply 20, there may be circumstances when it is desirable to allow drainage or depletion of the energy or charge stored in the energy storage device 22. For example, if the energy storage device 22 includes Nicad batteries such as a P3600 battery manufactured by the Sony Corporation of Japan, periodically or occasionally draining or discharging the energy storage device 22 will permit long term energy storage without a loss of energy storage capacity whereas an energy storage device 22 including such batteries maintained in a partially or fully charged state will, over time, develop a memory effect which reduces energy storage capacity. If desired, an on/off switch may also be placed between the energy storage device 22 and the energy discharge controller 34 to allow isolation of the energy discharge controller 34 from the remainder of the power supply 20 and to prevent unwanted or premature discharging of the energy storage device 22.

During operation and use of the power supply 20, the energy recharge source 24 generates and delivers energy via the node 36 to the regulator 26 or directly to the node 38 if the regulator 26 is not being used. The regulator 26 regulates the energy supplied to it by the energy recharge source 24 on the node 36 and limits the output energy provided by the regulator on the node 38 so that the energy storage device 22 does not become overcharged.

When the energy recharge device 22 24 supplies energy via the regulator 26 to the node 38, the energy stored in the energy storage device 22 begins to increase or charge toward is maximum charge or energy storage level. The sensor 32 monitors the energy stored or charge level in the energy storage device 22. Until such time as the amount of energy stored in the energy storage device 22 reaches the minimum threshold level, the sensor 32 keeps the energy converter 28 deactivated such that the load 30 is not coupled to the node 38 and such that the energy converter 28 does not supply any energy on the node 40. Therefore, all of the energy generated by the energy recharge source 24 is supplied or made available to the energy storage device 22. This process is particularly preferred when the energy storage device 22 includes batteries or other devices containing little or no initial charge or energy. When the charge level or amount of energy stored in the energy storage device 22 reaches a minimum threshold level, the sensor 32 sends a signal via the node 44 to the energy converter 28 that activates or turns on the energy converter 28 thereby coupling the node 40 to the node 38 and allowing the energy converter 28 to supply energy on the node 40 for the load 30. If desired, the sensor 32 can monitor the amount of energy or power stored in the energy storage device 22 even after the energy converter 28 is activated by the sensor 32 and supplying energy to the load 30 via the node 40 and, if the amount of energy or power stored in the energy storage device 22 drops below another minimum threshold level, the sensor 32 can deactivate the energy converter 28 such that all of the energy or power generated by the energy recharge source 24 is once again delivered to the energy storage device 22 so as to increase the amount of energy or charge stored in the energy storage device 22.

When the energy converter 28 is activated by the sensor 32, energy generated by the energy recharge source 24 and supplied by the regulator 26 to the node 38 is allowed by the energy converter 28 to flow or pass to the load 30 via the node 40. During the period of power delivery via the energy converter 28 to the load 30 on the node 40, energy generated by the energy recharge source 24 and supplied by the regulator 26 to the node 38 may also continue to flow to the energy storage device 22 so as to charge the energy storage device 22 or otherwise increase the amount of energy stored in the energy storage device 22. The amount of energy available to charge or otherwise replenish the energy storage device 22 when the energy converter 28 is activated may, in some cases, depend on the amount of energy 30 delivered to the load 30 by the energy converter 28.

If for any reason the energy recharge source 24 cannot provide enough energy via the energy converter 28 on the node 40 to adequately supply the load 30 with energy, energy stored in the energy storage device 22 may also be delivered to the load 30 on the node 40 by the energy converter 28. Such a situation may occur when, for example, the energy recharge source 24 is a solar panel, cell, or array and there is not sufficient light incident on the energy recharge source 24 to allow the energy recharge source 24 to generate sufficient energy for the load 30. Furthermore, in some situations, all of the energy flowing to the load 30 via the energy converter 28 will be supplied by the energy storage device 22.

As a result of the operation of the power supply 20, the energy recharge source 24 can supply or deliver energy to the energy storage device 22, thereby allowing the energy storage device 22 to increase its amount of stored energy or power, and to the load 30. In addition, when the energy storage device 22 contains a sufficient amount of stored energy or power, such stored energy or power can be delivered to the load 30 during periods when the energy recharge source 24 cannot adequately supply power or energy to the load 30, thereby allowing for increased and possibly continuous energy supply to the load 30 for operation of the load 30. In order to insure that the energy storage device 22 does not develop a power memory problem, as previously discussed above, the energy discharge controller 34 can be used to continuously or periodically drain or reduce the energy or power stored in the energy storage device 22. An exemplary implementation of the first embodiment of the power supply 20 of the present invention will be discussed in more detail below.

A second embodiment of the power supply 20 of the present invention is shown in FIG. 2 and includes a switch controller 48 connected or coupled to the load 30 via a node 50 and also connected or coupled to the node 46. In this configuration, power is supplied to the load 30 via the node 40 as previously discussed above and to the switch controller 48 via the node 46. This second embodiment of the power supply 20 is particularly well suited to applications where the load 30 is a microprocessor, sensor, or other device that needs a constant energy source to maintain operation and determines when the switch controller 48 is to be activated and the switch controller 48 requires its own power for operation. For example, the switch controller 48 may be, or may control the operation of, an electrical relay, solenoid valve, pneumatic valve, switch, pump, or other controlled device 49 and will need its own power or energy supply for activation of the controlled device 49. The load 30 determines when the switch controller 48 is to be activated and deactivated and controls the operation of the switch controller 48 via the node 50. When activated by the load 30, the switch controller 48 may itself then activate the controlled device 49. Preferably, when the energy converter 28 is not supplying energy to the load 30, the switch controller 48 is shut down, deactivated, or otherwise prevented from providing a control signal to the controlled device 49 such that energy stored in the energy storage device 22 is not drained via the switch controller 48. Thus, the energy converter 28 preferably supplies power to the load 30 before the switch controller 48 provides energy or power to the controlled device 49. An exemplary implementation of the second embodiment of the power supply 20 of the present invention will be discussed in more detail below.

A power supply 20 designed in accordance with the principles described above is particularly well suited for applications where energy must be continuously supplied or made available to a load, the energy storage device 22 is a rechargeable battery or other energy storage device starting in a initial condition having no stored energy charge or only a very low amount of stored energy or charge, and the energy recharge source 24 is a solar cell, panel, or array. Upon initial start up of the power supply 20 in this configuration, the sensor 32 keeps the energy converter 28 deactivated so that all of the energy generated by the energy recharge source 24, i.e., the solar cell, panel, or array, is supplied to the energy storage device 22, i.e., the rechargeable battery. Once the energy storage device 22 obtains a minimum threshold for its energy level of, for example, two volts, the sensor 32 can activate the energy converter 28 so as to allow some of energy generated by the energy recharge source 24 to be delivered to the load 30 while the remainder of the energy is supplied to the energy storage device 22 so that the energy level in the energy storage device 22 continues to increase. The energy storage device 22 (i.e., the battery) can supply the energy required by the load 30 when the energy recharge source 24 (i.e., the solar cell, panel, or array) cannot generate sufficient energy to operate the load 30.

An exemplary schematic diagram for the power supply 20 previously discussed above is illustrated in FIG. 3. For purposes of explanation, but not limitation, of the example implementation of the first embodiment of the power supply 20 of the present invention, the energy recharge source 24 will comprise a solar panel capable of producing fifty-five milliamps (55 mA) under a short circuit condition and a maximum direct sunlight open circuit output voltage of five and one-half volts (5.5 V). The solar panel can be, for example, an OKC Panel manufactured by Solar World of Colorado Springs, Colo., U.S.A. The energy storage device 22 will comprise a battery pack 52 capable of a nominal voltage of 3.6 volts and with a six hundred milliamp-hour (600 mA-hr) capacity rating. The battery pack 52 can be composed of, for example, three P3600 Nicad type batteries manufactured by the Sony Corporation of Japan. A 600 mA-Hr capacity rating for the battery back 52 used in the energy storage device 22 is chosen since an energy storage source having this rating capacity will usually be able to provide a minimum ten day operating ability from a fully charged state without additional charging energy supplied to the energy recharge source from the energy recharge source 24, assuming that the load 30 does not, on average, draw more than two and one-half milliamperes of current during the ten day time period. Weight, cost, and size considerations for the battery pack 52, in conjunction with energy requirements of the intended load, however, may dictate that a battery pack with a capacity rating higher or lower than 600 mA-Hr be used for the battery pack 52 used in the energy storage device 22. The energy discharge controller 34 will comprise a resistive component 54.

The regulator 26 includes a voltage regulator 56 and a diode 58. During normal operation, the voltage regulator 56 preferably produces an output voltage and current on the node 60 that is approximately equal to its input voltage and current on the node 36 produced by the energy recharge source 24. If, however, the input voltage on the node 36 is over a certain fixed threshold voltage level, the voltage regulator 56 caps or otherwise limits the output voltage on the node 60 to the fixed threshold voltage level. For example, the voltage regulator 56 may be a TPS7148 manufactured by Texas Instruments of Dallas, Tex., U.S.A., which allows its output voltage to linearly track its input voltage unless the input voltage is greater than approximately 4.8 volts, at which time the output voltage is limited to a maximum of approximately 4.8 volts. For purposes of explanation, but not limitation of the first embodiment of the power supply 20 of the present invention, the voltage regulator 56 will be assumed to be a linear regulator that makes the output voltage on the node 60 approximately equal to the input voltage on the node 36 unless the input voltage on the node 36 is greater than 4.8 volts, during which time the voltage regulator 56 will cap the voltage on the node 60 to 4.8 volts.

The diode 58 may be a SLG41-20 diode manufactured by General Instrument of Melville, N.Y., U.S.A. For purposes of explanation, but not limitation, of the first embodiment of the power supply 20, the diode 58 will be assumed to have a one-half volt voltage drop across it, thereby making the voltage on the node 38 one-half volt less than the voltage on the node 60 when the energy recharge source 24 is generating energy. The diode 58 also prevents electric current from flowing from the battery pack 52 into the voltage regulator 56 and, as a result, prevents discharge of the battery pack 52 or the flow of electric current into the energy recharge source 24. The diode 58 may not be needed for such purposes if either the voltage regulator 56 or the energy recharge source 24 itself can prevent the flow of electric current from the node 38 into the energy recharge source 24.

As previously discussed above, the energy converter 28 preferably is capable of creating a consistent output energy level on the node 40 regardless of the input energy level on the node 38. The energy converter 28 may include a MAX877 Step-up/Step-down DC—DC Voltage Converter 70 manufactured by Maxim Integrated Products of Sunnyvale, Calif., U.S.A., and the capacitors 72, 74 and the inductor 76 which provide supporting electronic circuitry for the voltage converter 70. The capacitor 72 may have a value of, for example, twenty-two microfarads, and is used to filter electrical input noise to the converter 70. The capacitor 74 may have a value of, for example, sixty-eight microfarads, and is used to filter the converter's 70 switching noise from the load 30. The inductor 76 may have a value of, for example, twenty-two microhenries, and is used to control switching frequency of the converter 70. For purposes of explanation, but not limitation of this example of the first embodiment of the power supply 20 of the present invention, the energy converter 28 will be assumed to create a five-volt output signal on the node 40 when the energy converter is activated by the sensor 32.

As previously discussed above, the sensor 32 monitors the energy or voltage level of the energy storage device 22 which, in this example, includes the battery pack 52. Until such time as the sensor 32 senses or detects a minimum threshold voltage level in the battery pack 52 of, for example, two and one-half volts (2.5 V), the sensor 32 maintains a logic low voltage signal on the node 44 connected to the energy converter 28, i.e., the voltage converter 70, thereby keeping the energy converter 28 deactivated or turned off and preventing the energy converter 28 from supplying output energy on the node 40. When the sensor 32 senses or otherwise detects the minimum voltage level of two and one-half volts (2.5 V) in the battery pack 52, the sensor 32 creates a logic high voltage signal on the node 44 connected to the energy converter 28, thereby activating or turning on the energy converter 28 such that the energy converter 28 creates an output signal on the node 40 and provides energy on the node 40 for delivery to the load 30. The sensor 32 can be, for example, a S8052ALR Voltage Detector 78 manufactured by Seiko Corporation of Japan.

Since the energy converter 28 preferably converts a range of input energy levels or voltages on the node 38 to a generally stable output energy level or voltage on the node 40, the energy converter 28 will generally operate at different levels of efficiency. For example, the energy converter 28 may more efficiently create a constant output voltage on the node 40 when the input voltage to the energy converter 28 on the node 38 is within a range of voltages than when the input voltage to the energy converter 28 on the node 38 is not within the range. The voltage level on the node 38 is the same as the voltage level of the battery pack 52. More specifically, for the implementation power supply 20 provided in FIG. 3, the voltage converter 70 forming the basis of the energy converter 28 most efficiently provides a five volt output signal on the node 40 when the input voltage on the node 38 is in a range between 2.5 volts and 3.6 volts. Therefore, for purposes of improving the operating efficiency of the energy converter 28, the sensor 32 preferably only activates the energy converter 28 when the voltage level of the battery pack 52 comprising the energy storage device 22 exceeds 2.5 volts. Since the battery pack 52 forming the energy storage device 22 is chosen in this example to have a nominal capacity of 3.6 volts, and since the sensor 32 is designed to activate or turn on voltage converter 70 forming the energy converter 28 only after the battery pack 52 has been charged to a minimum of 2.5 volts, the energy converter 28 will be operating or activated primarily when the input voltage on the node 38 is between 2.5 volts and 3.6 volts, the desired efficiency range for the voltage converter 70.

The optional energy or power discharge controller 34 coupled to the battery pack 52 includes a resistive component 54 which allows energy stored in the battery pack 52 to be discharged or drained over time. The resistive component 54 is connected to the battery pack 52 via the node 46. The node 46 is itself connected to the node 38 such that nodes 38, 46, and 42 form a single node. The preferred state of charge for a battery pack, particularly a Nicad type battery pack 52, when the load 30 is removed from the power supply 20 is a zero charge or dead battery state in which no energy or charge is stored within the battery pack 52. A zero charge or dead battery state of a battery or battery pack 52 permits long term storage of the battery or battery pack 52 without any loss or reduction in the battery or battery pack's 52 full charge capacity. In contrast, a battery or battery pack 52 stored in a partially or filly charged state will, over time, develop a memory effect which reduces battery capacity, particularly if the battery or battery pack 52 is comprised of Nicad type batteries.

The resistive component 54 is oriented across the battery pack 52 such that a current drain for the battery pack 52 is created, thereby discharging the battery pack 52. Preferably, the value for the resistive component 54 is chosen large enough so that the battery pack 52 does not drain too fast and small enough so that the battery pack 52 does not drain too slow. More specifically, the value for the resistive component 54 should be chosen large enough such that battery pack 52 is not discharged faster than the battery pack 52 is being charged by energy supplied by the energy recharge source 24 via the node 38, but not so large that it prevents the battery pack 52 from being nearly or completely discharged during periods of storage or non-use. For the electric circuit configuration illustrated in FIG. 3, the value for the resistive component 54 is preferably in a range between five thousand and one hundred thousand ohms and is optimally ten thousand ohms. When the battery pack 52 is charged to its rated capacity of 600 mA-Hrs, a ten thousand ohm value for the resistive component 54 provides a current load for the battery pack 52 that is less than one one-thousandth (1/1000) of the rated capacity (600 mA-Hrs) of the battery pack 52. Thus, given a fully charged battery pack 52 that is not periodically charged by energy supplied by the energy recharge source 24 or delivering energy to the load 30 via the energy or power converter 28, the battery pack 52 will take more than one thousand hours to discharge via the resistive component 54 and will, after being fully discharged, be maintained in a fully discharged state until it is recharged at a later time.

Since the maximum voltage supplied by energy recharge source 24, the voltage regulator 56, and the diode 58 on the node 38 is 4.3 volts (4.8 volts maximum supplied by the voltage regulator 56 on the node 60 minus the one-half voltage drop across the diode 58), and the maximum voltage of the battery pack is 3.6 volts, the battery pack 52 is not so undersized that significant premature failure of the battery pack 52 is likely to occur. Of course, the energy recharge source 24, regulator 26, and energy storage device 22 can be chosen and configured such that a closer match exists.

Figure 4:
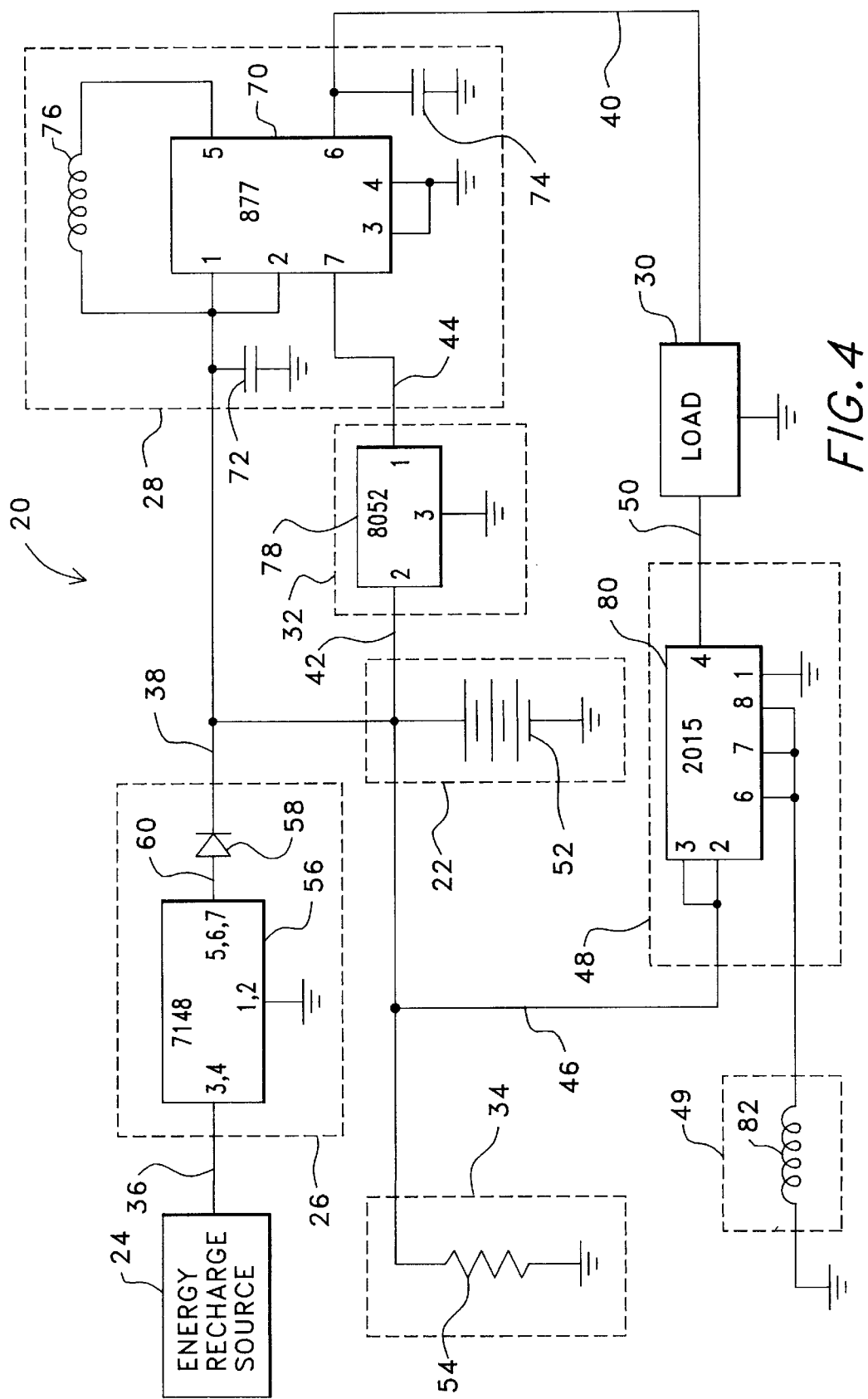
FIG. 4 is an exemplary schematic diagram of the power supply of FIG. 2 and illustrates the addition of a switch controller to the power supply of FIG. 3.

An example implementation of the second embodiment of the power supply 20 of the present invention is illustrated in FIG. 4 and includes the switch controller 48 connected to the load 30 via the node 50 and connected to the battery pack 52 via the node 46. As previously discussed above, the switch controller 48 allows a valve, switch, pump, relay, or other controlled device 49 to be controlled by the load 30 while also allowing the controlled device 49 to have power supplied to it directly from the energy recharge or supply source 24 via the regulator 26 or from the energy or power storage device 22. In the example implementation illustrated in FIG. 4, the switch controller 48 includes a TPS2015 Power Distribution Switch 80 manufactured by Texas Instruments of Dallas, Tex., U.S.A., which is used to energize the controlled device 49 which is, in this example, a solenoid 82. Energy to energize the solenoid 82 is provided to the power distribution switch 80 by the battery pack 52 via the node 46. The load 30 supplies a signal on the node 50 to the power distribution switch 80 that controls when the power distribution switch 80 energizes or activates the solenoid 82. The power distribution switch 80 incorporates a shut down feature such that power is not supplied to the solenoid 82 when the voltage level stored in the battery pack 52 is less than approximately 3.2 volts. The shut down feature prevents a high rate drain of the battery pack 52 when power converter 70 is not providing power to the load 30 via the node 40 and the load 40 is not providing an active logic control signal to the power distribution switch 80 via the node 50. Thus, the converter 70 preferably supplies power to the load 30 before the switch controller 48 provides energy or power to the controlled device 49 (i.e., the solenoid 82).

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow.

The embodiments of the invention in which an exclusive property or privilege is claimed are defined as follows:

1. Power supply apparatus, comprising:
    an energy storage device coupled to a first node and being capable of storing energy;
    an energy supply source coupled to said first node and being capable of producing energy;
    an energy converter having an input terminal coupled to said first node and an output terminal that is connectable to a load, said energy converter being capable of converting electric energy of varying voltages at said input terminal to electric energy at a constant voltage and of delivering the electric energy at said constant voltage to a load connected to said output terminal, but where said energy converter converts energy from said input terminal to said output terminal at efficiency levels which vary as a function of voltage on said input terminal such that a minimum desired energy conversion efficiency requires a corresponding minimum threshold voltage on said first node at said input terminal, and wherein said energy converter is actuateable in response to a control signal to convert electric energy from said input terminal to electric energy at said constant voltage for said load; and
    a detector connected to said first node and being capable of sensing voltage of said energy storage device at said first node and of providing said control signal upon sensing voltage at said first node which is at or above said minimum threshold voltage.

2. The apparatus of claim 1, including a discharger coupled to said first node.

3. The apparatus of claim 2, wherein said discharger includes a resistive component.

4. The apparatus of claim 1, including a discharger coupled to said energy storage device and capable of draining said energy stored in said energy storage device.

5. The apparatus of claim 1, including a switch controller coupled to said energy storage device and to said load.

6. The apparatus of claim 5, wherein said switch controller receives energy from said energy storage device.

7. The apparatus of claim 5, wherein said switch controller receives energy from said energy supply device.

8. The apparatus of claim 5, wherein said load receives energy from said energy converter.

9. The apparatus of claim 8, wherein said load generates a load signal and transmits said load signal to said switch controller.

10. The apparatus of claim 9, wherein said switch controller generates a controller signal responsive to said load signal.

11. The apparatus of claim 1, wherein said energy storage source includes at least one battery.

12. The apparatus of claim 1, wherein said energy source includes at least one capacitor.

13. The apparatus of claim 1, wherein said energy supply source includes at least one solar cell.

14. The apparatus of claim 1, including a voltage regulator interposed between said energy supply source and said first node, said voltage regulator being capable of capping voltage supplied at said first node to a maximum voltage limit, regardless of higher voltage levels provided by said energy supply source.

15. The apparatus of claim 14 wherein said maximum voltage limit is approximately equal to said energy storage device's preferred maximum voltage.

16. The apparatus of claim 14, wherein said maximum voltage limit is set such that said energy converter operates at a predetermined conversion efficiency level.

17. The apparatus of claim 1, wherein said energy storage device comprises a rechargeable battery and said energy supply source comprises a solar cell electric generator.

18. The apparatus of claim 1, wherein said minimum desired energy conversion efficiency is about fifty percent (50%).

19. The apparatus of claim 1, wherein said minimum threshold voltage is about 2 volts.

20. The apparatus of claim 1, wherein said minimum desired energy conversion efficiency is about seventy percent (70%).

21. The apparatus of claim 1, wherein said minimum threshold voltage is about 2.5 volts.

22. The apparatus of claim 1, including a diode interposed between said first node and said energy supply source in a manner that prevents back flow of electric energy from said energy storage device to said energy supply source.

23. A solar power supply system, comprising:
    a solar power source connected to a node, said solar power source having a capacity to produce electric energy at varying voltage and current output levels depending on available sunlight;
    a rechargeable battery connected to said node, said rechargeable battery being capable of receiving and storing electric energy from said solar power source via said node at varying voltage levels and of delivering stored electric energy to said node at varying voltage levels;
    an energy converter that has an input terminal connected to said node and an output terminal that is connectable to a load, said energy converter being actuatable in response to a control signal to convert electric energy of varying voltages from said node to electric energy of a constant voltage level at said outlet terminal for powering said load, and said energy converter having varying energy conversion efficiency levels that vary as a function of the varying voltage levels at said node, there being a minimum threshold voltage level at said node that corresponds with a minimum desired energy conversion efficiency level at which the solar power source can deliver energy to the load and supply energy to the rechargeable battery; and
    a voltage detector connected to said node and having a capability of providing said control signal to said energy converter in response to detection of voltage at said node that is equal to or greater than said minimum threshold voltage level.

24. The solar power supply system of claim 23, wherein said minimum desired energy conversion efficiency level is about fifty percent (50%).

25. The solar power supply system of claim 23, wherein said minimum threshold voltage level is about 2.0 volts.

26. The solar power supply system of claim 23, wherein said minimum desired energy conversion efficiency level is about seventy percent (70%).

27. The solar power supply system of claim 23, wherein said minimum threshold voltage level is about 2.5 volts.

28. The solar power supply system of claim 23, wherein said rechargeable battery has a maximum desired voltage level, thus there is a maximum desired voltage level at said node, and solar power supply system includes a voltage regulator positioned between said solar power source and said node, said voltage regulator having a capability of capping electric energy produced by said solar power source to not exceed said maximum desired voltage level at said node.

29. The solar power supply system of claim 23, including a diode positioned between the node and the solar power source in a manner that prevents back flow of electric energy from the rechargeable battery to the solar power source.

30. The solar power supply system of claim 23, wherein the solar power source includes at least one solar cell.

31. The solar power supply system of claim 23, wherein said rechargeable battery comprises a capacitor.

32. The solar supply system of claim 23, wherein said rechargeable battery comprises a Ni~Cd battery.

33. A power supply system, comprising:
an energy recharge source connected to a node, said energy recharge source having a capacity to produce electric energy, but at varying energy output levels that can decrease to be insufficient to power a load and then increase again;
an energy storage device connected to said node, said energy storage device being capable of receiving and storing electric energy from said energy recharge source via said node at varying voltage levels and of delivering stored electric energy to said node at varying voltage levels;
an energy converter that has an input terminal connected to said node and an output terminal that is connectable to the load, said energy converter being actuatable in response to a control signal to convert electric energy of varying voltages from said node to electric energy of a constant voltage level at said outlet terminal for powering the load, and said energy converter having varying energy conversion efficiency levels that vary as a function of the varying voltage levels at said node, there being a minimum threshold voltage level at said node that corresponds with a minimum desired energy conversion efficiency level at which the energy recharge source can deliver energy to the load and supply energy to the energy storage device to recharge the energy storage device; and
a voltage detector connected to said node and having a capability of providing said control signal to said energy converter in response to detection of voltage at said node that is equal to or greater than said minimum threshold voltage level.

34. The power supply system of claim 33, wherein said energy recharge source comprises a solar cell, panel, or array, and said varying energy output levels vary as a function of sunlight intensity incident on said solar cell, panel, or array.

35. The apparatus of claim 34, wherein said energy storage device's maximum energy output level is approximately equal to said energy storage device's energy storage capacity.

36. A method of initially actuating a power supply that comprises a solar power source, a rechargeable energy storage device that initially has virtually no energy stored in it so that its voltage is virtually zero, and a DC—DC voltage converter with its input connected at a common node to both the solar power source and the rechargeable energy storage device and with its output connected to a load, the method comprising:

exposing the solar power source to light energy to produce electric energy to said node while keeping said DC—DC voltage converter deactuated so that all of the electric energy produced by the solar power source flows into said rechargeable energy storage device and none of the electric energy flows to the load in order to build up voltage of said rechargeable energy storage device at said common node;
monitoring voltage of said rechargeable energy storage device at said common node and, when the voltage of the rechargeable energy storage device at said common node rises to a minimum voltage threshold that corresponds to a minimum desired energy conversion efficiency capability of said DC—DC voltage converter, then actuating said DC—DC voltage converter to convert and deliver at least some of the electric energy available at said common node to said load with said DC—DC voltage converter operating at or above said minimum desired energy conversion efficiency.

37. The method of claim 36, wherein said minimum desired energy conversion efficiency is about fifty percent (50%).

38. The method of claim 36, wherein said minimum desired energy conversion efficiency is about seventy percent (70%).

39. A method of powering a load with a solar power source that produces electric energy at varying voltage and current output levels depending on available sunlight, comprising:
connecting the solar power source to a node;
connecting a rechargeable battery to said node in such a manner that said rechargeable battery can receive electric energy from the node for storage and can deliver stored electric energy to the node;
connecting an energy converter to the node in a manner such that said energy converter is capable of converting electric energy of varying voltage levels from the node and at corresponding varying energy conversion efficiencies to a electric energy of constant voltage at a converter output;
connecting the load to the converter output;
determining a minimum energy conversion efficiency level and a corresponding minimum threshold voltage level at the node at which the solar power source can deliver electric energy to the load and supply electric energy to recharge the rechargeable battery;
monitoring the varying voltage levels at the node; and
enabling the energy converter to convert electric energy of the varying voltage levels at the node to electric energy of a constant voltage level at the converter output for the load only when the node is at a voltage equal to or greater than the minimum threshold voltage level.

40. The method of claim 39, including positioning a diode between the solar power source and the node in a manner that prevents back flow of electric energy from the rechargeable battery to the solar power source.

41. The method of claim 39, wherein the minimum energy conversion efficiency level is about fifty percent (50%).

42. The method of claim 39, wherein the minimum energy conversion efficiency level is about seventy percent (70%).

* * * * *